Dec. 8, 1931.  R. J. BRITTAIN, JR  1,835,458
CONTROLLING MECHANISM
Filed April 14, 1925   2 Sheets-Sheet 1

INVENTOR;
RICHARD J. BRITTAIN, Jr
BY
HIS ATTORNEY.

Dec. 8, 1931.   R. J. BRITTAIN, JR   1,835,458
CONTROLLING MECHANISM
Filed April 14, 1925   2 Sheets-Sheet 2
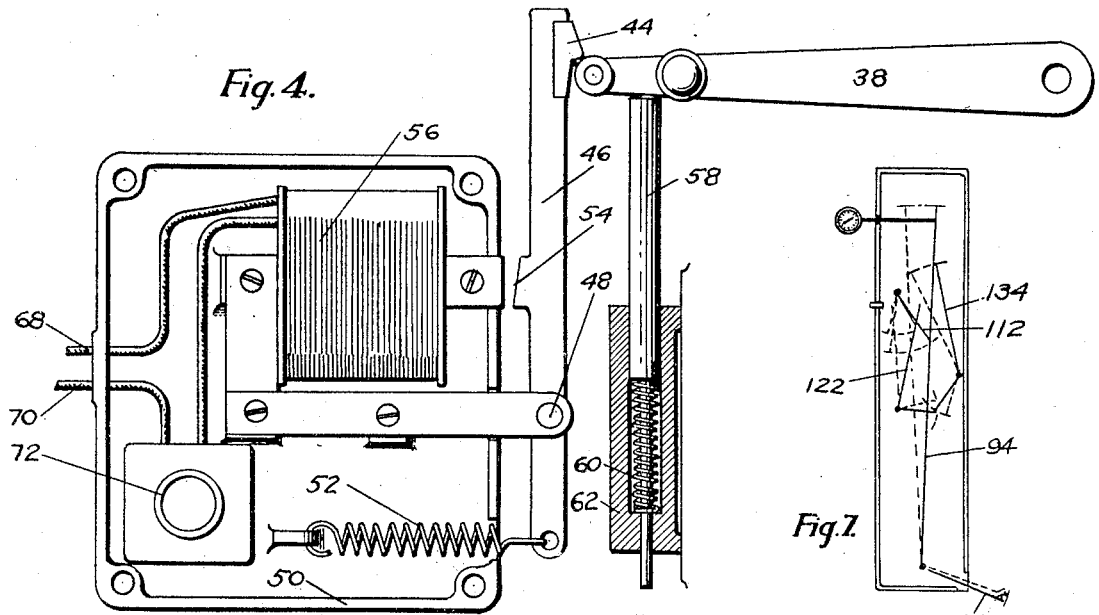
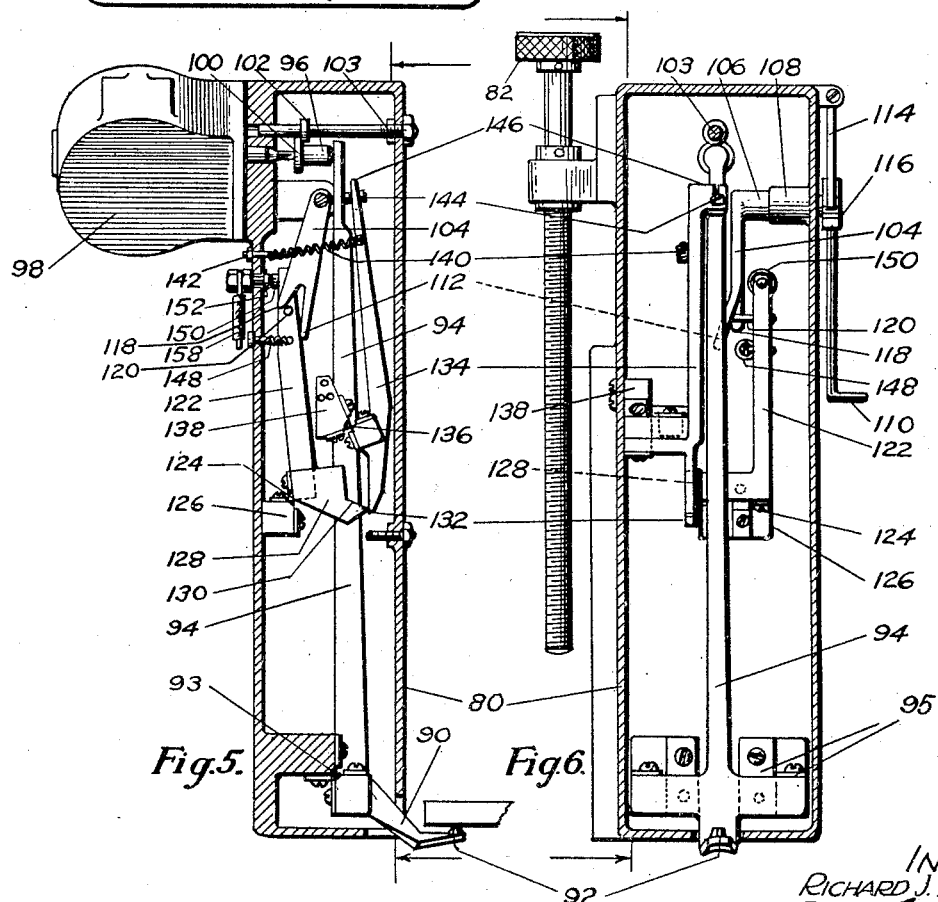
INVENTOR;
RICHARD J. BRITTAIN JR
By
HIS ATTORNEY.

Patented Dec. 8, 1931

1,835,458

UNITED STATES PATENT OFFICE

RICHARD J. BRITTAIN, JR., OF NEWARK, NEW JERSEY, ASSIGNOR TO GENERAL MOTORS CORPORATION, OF DETROIT, MICHIGAN, A CORPORATION OF DELAWARE

CONTROLLING MECHANISM

Application filed April 14, 1925. Serial No. 23,117.

This invention relates to controlling mechanism for grinding machines and the like and comprises all the features of novelty herein disclosed as embodied in apparatus for automatically gauging and backing a grinding wheel away from a work-piece when the latter reaches a desired size.

When a gauge is kept in contact with a work-piece being ground and indicates the change in size, an operator must be continually on the lookout to stop the machine or back the wheel away when the piece reaches the desired size. It has been proposed to have the gauge arm complete an electric circuit directly by its own motion and thus furnish some indication that the piece is ground to size but such a mechanism will be uncertain in operation because any relative deflection between the work-piece and the gauge will introduce a large variation in the position of the contacts and hence will not accurately detect the time when the piece reaches size. Furthermore the extent of motion of a gauge is so slight that good electric contact cannot be obtained and the consequent pitting or wear of the contacts introduces further errors.

It is, accordingly, an object of this invention to provide a controlling mechanism which will accurately determine when a work-piece has reached a desired size and automatically cause the wheel or other tool to back away. In the embodiment selected for illustration, accuracy is obtained by utilizing an auxiliary contact apparatus controlled by the gauge through a trip mechanism but having a movement independent of the gauge to secure a more definitely electrical connection.

To these ends and also to improve generally upon devices of the character indicated my invention consists in the various matters hereinafter described and claimed.

In the drawings, Figure 1 is a front elevation of an internal grinder with the invention applied.

Figure 4 is a front view of certain details.

Figure 5 is a rear view of the gauge box with its cover plate removed.

Figure 6 is a side elevation of the parts shown in Figure 5.

Figure 7 is a diagram of the gauge parts in a different position.

There are well known grinding machines on the market which have a work holding chuck and a grinding wheel mounted on a carriage which reciprocates to traverse the wheel along the work. The carriage usually has spaced dogs which alternately engage a reversing lever to change the direction of motion and it is machines of this type for which this invention is well adapted. In this invention, a gauge member or feeler is kept continually in contact with the work piece and the movement of the gauge member or feeler operates a trip to release an independently movable electrical contact making member which completes an electric circuit. This electric circuit does several things, among them effecting the movement of devices which move one of the dogs on the grinding wheel carriage to prevent the reversal of the carriage and thereby cause the wheel to back away when the work-piece is ground to size.

Figure 1:
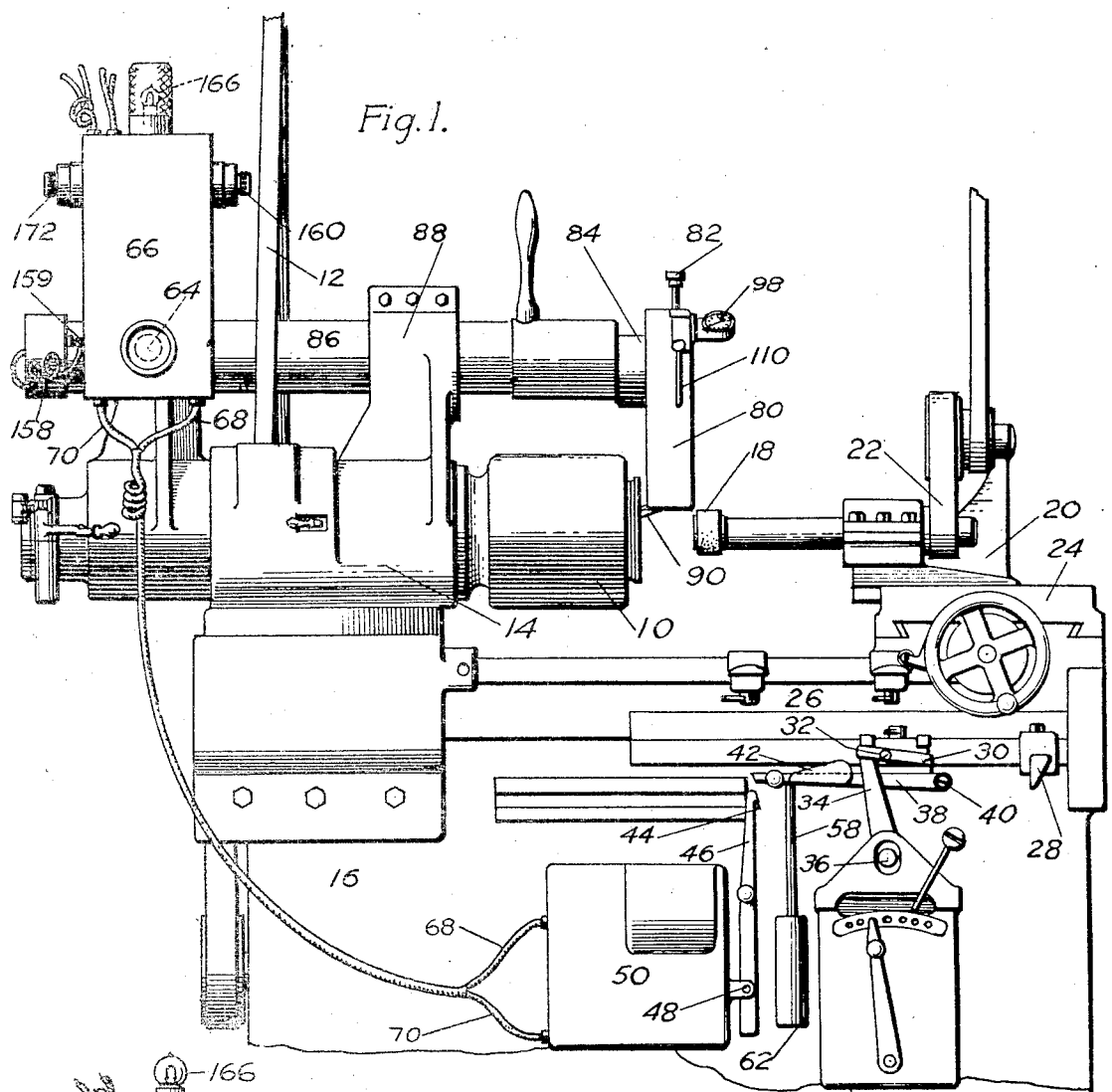
Figure 2:
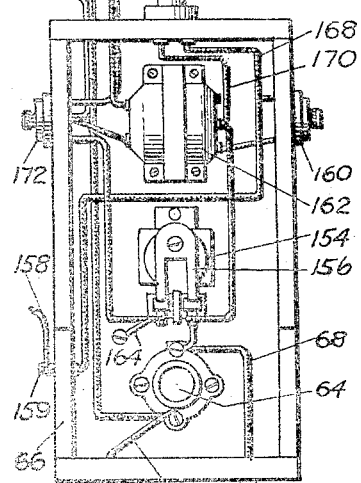
Figure 2 is a front view of certain detail parts of the control mechanism in their casing.
Figure 3:
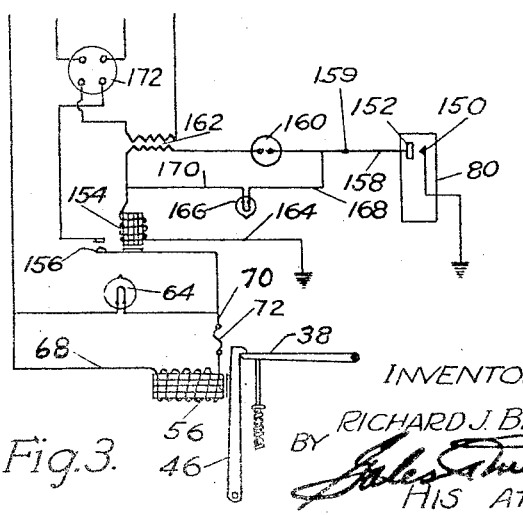
Figure 3 is a diagram of electrical connections.

In Figure 1, the numeral 10 indicates a chuck for holding and rotating a ring or other work-piece to be internally ground. The chuck is rotated by a belt 12, its shaft being journalled in a headstock 14 mounted on the frame 16 of an internal grinder. A grinding wheel 18 has its spindle journalled in a standard 20 and is driven by belt 22. The standard is carried by a slide 24 mounted for cross feeding movement on a reciprocating carriage 26 having dogs 28 and 30 for automatically operating a reversing mechanism. The dog 30 is pivoted at 32 on the carriage so that it can be raised to prevent its engaging a reverse lever 34 pivoted at 36, as when the work has reached size and it is desired to back the grinding wheel away from the work. The dog 30 is actuated automatically by novel mechanism controlled by work gauging instrumentalities.

An arm 38, pivoted at 40 on the frame and carrying a cam member 42, is normally locked in a depressed position by a hook 44 on a latch arm 46 pivoted at 48 on a magnet casing 50. In the depressed positions of the arm 38 and cam member 42, the dog 30 will engage the reverse lever 34 in the usual way. A spring 52 holds the latch arm 46 in locking position but an armature 54 on the latch arm is arranged to be attracted by a magnet 56 to release the latch arm. Upon the release of the latch arm, a plunger rod 58 is lifted by a coil spring 60 in a guide 62 and the cam member 42 on the arm 38 is lifted to such a position that the pivoted dog 30 will be guided freely over the upper end of the reverse lever 34 whereupon the carriage will back the grinding wheel away from the work without reversing. The magnet is controlled by the gauging instrumentalities as will later appear. To furnish a signal, easily visible at a distance, that the work has been ground down to size, a red light 64 in a box 66 fastened on the headstock is connected up in parallel with the magnet circuit, wires 68 and 70 leading to the magnet through an interposed fuse 72 in the casing 50. The magnet and red light circuits are closed by a magnetic switch also under control of the gauging instrumentalities.

Referring to Figures 1, 5 and 6, a gauge box 80 is adjustably mounted by a hand operated screw 82 on an arm 84 which is capable of a sliding and swinging movement in a hollow sleeve 86 mounted in standards 88 directly on the headstock. For details of this mounting reference may be made to a copending application of Chapman and Brittain, Serial No. 715,906, filed May 26, 1924, Patent 1,762,810. The sliding and swinging movement is to enable a gauge arm 90 having a gauge point or feeler 92 to be moved into and out of the interior of a ring or other work-piece. The gauge arm 90 is the shorter arm of a gauge lever pivoted at 93 in a well known manner on pairs of thin crossed springs 95 at right angles to one another in the gauge box and the longer arm 94 extends lengthwise of the box and its end abuts against a gauge stem 96 on an indicator 98. For a more detailed disclosure of the spring pivot mounting which forms no essential part of the present invention, reference may be made to the applicant's Patent 1,624,654 granted April 12, 1927. The gauge stem carries a collar 100 arranged to engage a collar 102 on a rod 103 to limit the movement of the indicator needle.

To prevent the gauge point or feeler 92 from interfering with the end of the work-piece when the gauge is being applied, the long arm 94 is swung to one limit of movement by a forked crank 104 as indicated in Figures 5, 6 and 7. The crank has its shaft 106 rockably mounted in a hollow boss 108 on the interior of the gauge box and is operated by a crank handle 110 outside the box. The forked crank has its longer arm 112 bent laterally to overlie and engage the arm 94 and the handle 110 can be locked temporarily by a spring pawl 114 which engages a notch in the hub 116 of the handle. When the gauge point or feeler has been placed inside the work-piece, the forked crank is released and locked in another position so that thereafter the gauge point or feeler will ride yieldingly against the work. The gauge point or feeler is designed to continually ride against the work piece at the top interior surface thereof while the grinding wheel engages the work piece at a point 90° away. This minimizes the effect on the indicator and gauge of any deflection of the work-piece, due to pressure of the wheel. Having the gauge mounted on the same support as the work holder also minimizes any relative deflection. The other parts in the gauge box have mainly to do with the establishing of a good electrical contact and the setting of a trip mechanism for a circuit immediately when the work-piece is ground down to the desired size.

The forked crank 104 has a short arm 118 arranged to engage a pin 120 projecting from an electric contact making lever 122 pivoted at 124 on crossed springs supported on a cleat 126 in the box. The contact making lever has an offset plate or arm 128 at one side of arm 94 with a face 130 arranged to hook in front of the point 132 of a trip lever 134 pivoted at 136 on crossed springs supported on a cleat 138 in the box. A coil spring 140 attached to the trip lever and to an adjusting screw 142 on the box tends to pull the lever to releasing position. This spring also furnishes the pressure to cause the gauge point or feeler to follow up the work as it is ground and transmits this tendency to arm 94 through an adjusting screw 144 fastened in a lateral extension 146 of the trip lever. The trip lever is shown in Figure 5 in its releasing position where its point 132 is moved to release the face 130 of the plate or arm 128. The adjusting screw 144 provides an accurate means to adjust the trip lever with relation to the contact making lever. When released, the contact making lever 122 is immediately pulled to the position shown in Figure 5, by a coil spring 148 which forces a contact piece 150 on the contact making lever against a fixed contact 152 on the box. The contact making lever is electrically grounded on the frame and the union of the contacts 150 and 152 completes a circuit which energizes a magnet 154 to close a magnetic switch 156. A wire 158 leads from the fixed contact 152 through the hollow-sleeve 86 of the gauge mounting to a binding post 159 on the box 66 and the binding post is electrically connected to a one-pole switch 160. This switch 160 is connected to the secondary winding of a transformer 162 in circuit with the magnet 154 which is grounded through a wire 164. A white light 166 is connected by wires 168 and 170 to the secondary winding of the transformer to indicate when the one-pole switch 160 is closed. The primary winding is in circuit with an A. C. line through a double pole switch 172 which also closes a D. C. circuit through the magnet 56 and the switch 156.

In operation, the crank handle 110 is turned to move the gauge parts to the position indicated in Figure 7. Then the gauge box 80 is slid and swung on its mounting in the sleeve 86 until the gauge point or feeler 92 is inside the work-piece. Then the crank handle 110 is turned to allow the spring 140 to press the gauge point or feeler continually against the work-piece and the work-piece is ready to be ground. When the work-piece reaches the desired size as determined by the previous adjustment of the screw 144 and the prior relative positions of trip lever 134 and contact making lever 122, the trip lever releases the contact making lever which is pulled by the spring 148 to unite the contacts 150 and 152. This completes the circuit through the magnet 154, closes the magnetic switch 156, and energizes the magnet 56 to operate latch arm 46 and release the arm 38. The spring pressed rod 58 then elevates the cam member 42 into the path of the pivoted dog 30 which is raised to allow the wheel carriage to back away from the work-piece without reversing. The red light 64 is also lighted to signal to the operator that the roughing cut is finished. The operator may then apply another work-piece or give the first piece a finish grind under hand feed control at his convenience.

Although the invention has been described by reference to a specific construction, it should be understood that, in its broader aspects, it is not necessarily limited to the form selected for mere illustrative purposes.

I claim:

1. In apparatus of the character described, in combination, a grinding wheel, a work holder, a reciprocating carriage for one of said members, a reversing lever, a pivoted dog on said carriage for normally engaging the reversing lever, a member for swinging said dog out of range of the reversing lever, a spring pressed rod for moving said member into dog-engaging position, and means for rendering said rod effective or ineffective to move said member; substantially as described.

2. In apparatus of the character described, in combination, a grinding wheel, a work holder, a reciprocating carriage for one of said members, a reversing lever, a pivoted dog on said carriage for normally engaging the reversing lever, a member for swinging said dog out of range of the reversing lever, a spring for moving said member into dog-engaging position, a latch for locking said member out of dog-engaging position, and means for releasing the latch; substantially as described.

3. In apparatus of the character described, in combination, a grinding wheel, a work holder, a reciprocating carriage for one of said members, a reversing lever, a pivoted dog on said carriage for normally engaging the reversing lever, a member for swinging said dog out of range of the reversing lever, a spring for moving said member into dog-engaging position, a latch for locking said member out of dog-engaging position, and magnetic means for releasing said latch; substantially as described.

4. In apparatus of the character described, in combination, a grinding wheel, a work holder, a reciprocating carriage for one of said members, a reversing lever, a movable dog on said carriage for normally engaging the reversing lever, a member for moving said dog out of range of the reversing lever, a spring pressed rod for moving said member into dog-engaging position, a feeler having contact with a work piece in the holder, and mechanism controlled by the feeler for controlling the operation of said rod; substantially as described.

5. In apparatus of the character described, in combination, a grinding wheel, a work holder, a reciprocating carriage for one of said members, a reversing lever, a movable dog on said carriage for normally engaging the reversing lever, a member for moving said dog out of range of the reversing lever, a spring for moving said member into dog-engaging position, a latch for locking said member out of dog-engaging position, a feeler having contact with a work piece in the holder, and mechanism controlled by the feeler for operating said latch; substantially as described.

6. In apparatus of the character described, in combination, a grinding wheel, a work holder, a reciprocating carriage for one of said members, a reversing lever, a movable dog on said carriage for normally engaging the reversing lever, a member for moving said dog out of range of the reversing lever, a spring for moving said member into dog-engaging position, a latch for locking said member out of dog-engaging position, a magnet for releasing said latch, a feeler having contact with a work piece in the holder, and mechanism controlled by the feeler for energizing said magnet; substantially as described.

7. In apparatus of the character described, in combination, a grinding wheel, a work holder, a reciprocating carriage for one of said members, a reversing member, a movable dog on said carriage for normally engaging the reversing member, a spring operated member for moving the dog out of range of the reversing member, a feeler having contact with a work-piece in the holder, and mechanism controlled by the feeler for controlling the operation of the spring operated member; substantially as described.

In testimony whereof I hereunto affix my signature.

RICHARD J. BRITTAIN, Jr.